United States Patent [19]

Mainolfi et al.

[11] Patent Number: 5,026,445

[45] Date of Patent: Jun. 25, 1991

[54] METHOD AND APPARATUS FOR PRODUCING CARPETED PANELS

[75] Inventors: Sylvio J. Mainolfi, Watertown; Gerald F. Patry, Brookfield; Henry A. Pensiero, Stamford, all of Conn.

[73] Assignee: Branson Ultrasonics Corporation, Danbury, Conn.

[21] Appl. No.: 539,198

[22] Filed: May 11, 1990

[51] Int. Cl.⁵ .............................................. B29C 65/00
[52] U.S. Cl. .................................. 156/73.5; 156/580.2
[58] Field of Search .................... 156/73.5, 73.6, 306.3, 156/72, 73.1, 580.2; 264/68, 69

[56] References Cited

U.S. PATENT DOCUMENTS

| | | | |
|---|---|---|---|
| 3,873,387 | 3/1975 | Schoening | 156/73.5 |
| 3,920,504 | 11/1975 | Shoh et al. | 156/580 |
| 4,759,892 | 7/1988 | Bonzo | 264/251 |
| 4,776,905 | 10/1988 | Cheung et al. | 156/73.5 |
| 4,904,319 | 2/1990 | Divincenzo et al. | 156/73.4 |

Primary Examiner—David A. Simmons
Assistant Examiner—J. Sells
Attorney, Agent, or Firm—Polster, Polster and Lucchesi

[57] ABSTRACT

Carpeted panels comprising a thermoplastic substrate and a synthetic fiber carpet are produced by bonding the respective parts to one another using a vibration welding apparatus for causing the generation of frictional heat at the interface between the substrate and the carpet. One of the platen of the welding apparatus confronting the carpet is provided with a pattern of closely spaced pins engaging the carpet and urging the carpet into forced engagement with the substrate. On account of the closely spaced pins and the relatively low amplitude of the reciprocating motion, a bond is achieved substantially over the entire interface between the carpet and the substrate.

12 Claims, 1 Drawing Sheet

METHOD AND APPARATUS FOR PRODUCING CARPETED PANELS

BRIEF BACKGROUND OF THE INVENTION

This invention concerns the manufacture of carpeted panels as used for structural and decorative purposes. A carpeted panel comprises essentially a substrate which is a plastic molded or thermoformed panel to which a carpet made of synthetic fibers is attached. Panels of this type are quite common, but one of the best known applications is in the automobile industry where door panels, kick panels, instrument panels, consoles, seat backs, rear decks, etc. frequently comprise such carpeted panels.

Heretofore, such panels have been fabricated, for instance, by mechanically stapling the carpet material to the substrate. Stapling lacks a desirable appearance and provides fastening only at the location of the staple. Another method for fastening comprises the use of ultrasonic spot welding. But even this method leaves visual weld marks at the area where the ultrasonic horn, or anvil, engages the carpet material and, as before, adhesion is provided only at the location of the weld spots. A further method involves the use of an adhesive layer disposed between the carpet material and the substrate. The use of adhesive material is time consuming due to the required curing time, adhesive materials create fumes and fail to stand up under extreme temperature ranges. There is generally a lack of adhesive strength with the passage of time.

SUMMARY OF THE INVENTION

The novel method and apparatus disclosed hereafter involves the use of vibration or friction welding for providing a satisfactory bond between the substrate and the carpet while not impairing the cosmetic appearance of the carpet. This result is achieved by placing the underside of the carpet in forced, superposed contact with the upper side of the substrate and providing for a brief time interval relative translating reciprocating motion between the carpet and the substrate. If the carpet and the substrate are made of compatible synthetic material, a sound and proper bond is achieved between the carpet and the substrate, substantially over the entire area of contact. An apparatus suitable for accomplishing such vibration welding is show, for instance, in U.S. Pat. No. 3,920,504 issued to A. Shoh entitled "Friction Welding Apparatus", dated Nov. 18, 1975. The apparatus broadly includes two horizontally disposed platen, each adapted to receive and support one of the parts to be welded together, means for bringing the platen with parts disposed thereupon into forced contact, and drive means coupled to one of the platen for providing translating reciprocating motion to said one platen while the other platen is retained stationary. Frictional heat generated at the interface between the mating parts causes a weld.

Panels assembled in this manner are characterized by superior appearance and durability when compared with the prior methods and techniques of providing carpeted panels.

One of the principal objects of this invention is the provision of an improved method for manufacturing carpeted panels.

Another important object of this invention is the provision of a method for manufacturing carpeted panels by the use of vibration welding for joining carpet material to a thermoplastic substrate.

Another important object of this invention is the provision of a method for manufacturing carpeted panels in a fast and economical manner.

Still another object of this invention is the provision of a specially constructed platen for providing forced engagement between the carpet and the substrate.

Further and still other objects of this invention will be more clearly apparent when reading the following specification in conjunction with the accompanying drawings.

DETAILED DESCRIPTION OF THE INVENTION

Figure 1:
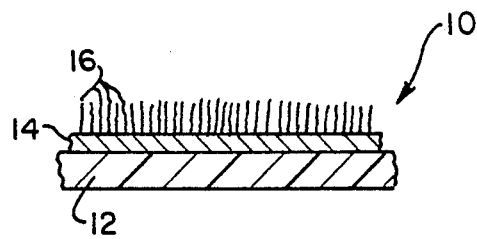
FIG. 1 is an elevational view, partly in section, of a carpeted panel.

Referring now to the figures and FIG. 1 in particular, there is shown a welded carpeted panel 10 comprising a substrate 12 and a superposed carpet welded thereto comprising a layer of backing material 14 and fibers 16. The substrate preferably is a thermoformed or molded panel made from ABS (acrylonitrile, butadiene and styrene), polypropylene, or polyethylene material. The carpet backing material most commonly comprises polyethylene, polypropylene, or latex material, while the fibers most frequently are made from nylon or polypropylene material. The carpet can be of the tufted or needled type, well known in the art. Also, unbacked carpets are usable for the present application, but then must be made from thermoplastic fiber material, not natural fibers, as the latter do not provide adhesive bonding when subjected to frictional heat followed by cooling.

Figure 2:
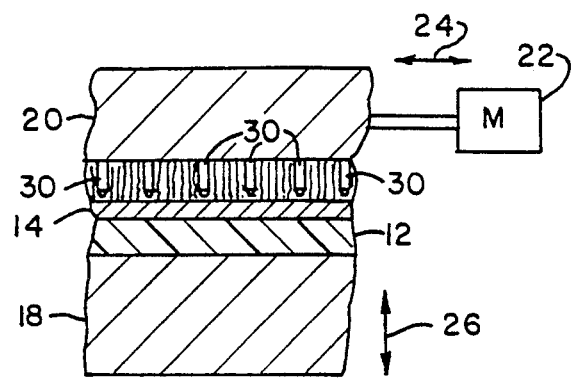
FIG. 2 is a schematic elevational view depicting the apparatus for providing an assembled panel by vibration welding.
Figure 6:
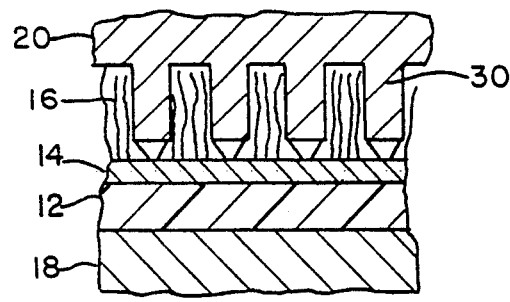
FIG. 6 is a view, similar to FIG. 2, but slightly enlarged for a better understanding.

Referring now to FIGS. 2 and 6, there is shown the apparatus and method for providing the assembled panel 10. Numeral 18 depicts the stationary platen and numeral 20 shows the movable platen which is coupled to motive means 22 for causing the platen 20, responsive to energizing the motive means 22, to undergo translating reciprocating motion in the horizontal plane, see arrow 24. The platen 18 is adapted to undergo vertical motion for inserting workpieces to be welded and for removing welded workpieces, see arrow 26. Moreover, force means, not shown, urge the platen 18 toward the platen 20 during the weld cycle. The motive means 22 may comprise magnetic means operating against leaf springs, all as shown in detail in the patent to A. Shoh supra. Inserted between the platen 18 and platen 20 are the substrate 12 and the carpet comprising the backing 14 and the fibers 16 upstanding from the backing 14.

Figure 3:
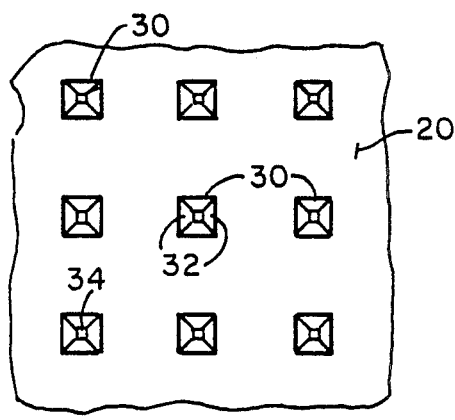
FIG. 3 is a greatly enlarged top plan view of the upper panel having upstanding pins.
Figure 4:
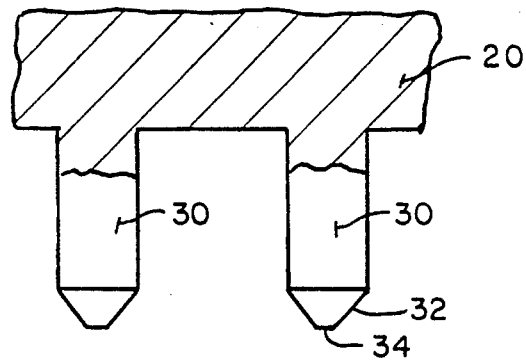
FIG. 4 is a greatly enlarged elevational view of the pins upstanding from the platen.

An important aspect of the present invention concerns the use of a platen having a pattern of relatively closely spaced pins 30 (typically 9 to 81 pins per square inch) for engaging the backing layer of the carpet and urging the carpet underside into intimate engagement with the substrate. In a typical embodiment, see FIGS. 4 and 6, each pin is about 0.060 inch square (1.5 mm) thick, tapered near the top, see numeral 32, with a flat, non-piercing end surface 34. The pins, like the platen, are made from metal, such as aluminum or steel. Also, in a typical embodiment, the patten comprises 16, 32, or 64 pins per square inch (6.5 cm²), all pins equally spaced from one another as illustrated in FIG. 3. Moreover, the height of the pins preferably is selected to be a minimum of 1.1 times the thickness of the carpet including the backing layer.

Figure 5:
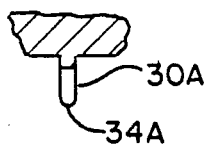
FIG. 5 is an elevational view of an alternative pin construction.

An alternative embodiment of the pins is shown in FIG. 5 wherein the pin 30A is provided with a rounded end surface 34A.

Typical weld cycles range between five and twenty seconds depending on the area to be welded and the density of the fibers, using a relatively low frequency of 240 displacements per second of the movable platen with a peak-to-peak excursion amplitude of 0.060 to 0.070 inch (1.5 to 1.8 mm). By virtue of the closely spaced pins and the small amplitude of displacement, substantially the entire area of the mating surface is heated and becomes soft in response to the dissipation of frictional heat and cools upon termination of the vibrations, thus achieving a substantially complete bond between the substrate and the carpet. The result is a significant improvement over the processes used heretofore.

Table 1 shows the welding compatibility of the most commonly used materials. Compatibility denotes a strong bond, some compatibility a weaker bond, while limited compatibility denotes a weak bond.

TABLE 1

| CARPET | SUBSTRATE MATERIAL | | |
|---|---|---|---|
| BACKING MATERIAL | ABS | PP | PE |
| LATEX | X | X | X |
| POLYETHYLENE (PE) | — | X | X |
| POLYPROPYLENE (PP) | — | X | O |
| NONE (UNBACKED) | O | X | O |

Note:
X Compatibility
O Some Compatibility
— Limited Compatibility
ABS - acrylonitrile, butadiene and styrene Carpets which have no separate backing layer can be welded also to a substrate as long as the fibers comprise thermoplastic material, such as nylon or polypropolene, which materials soften and flow in response to the dissipation of frictional heat and then will adhere and bond with the substrate upon cooling.

In an alternative embodiment, the platen 20 can be stationary and the platen 18 be subjected to the translating reciprocating motion without departing from the principle of the invention. However, the pins 30 must be disposed to engage the carpet for causing the intimate engagement between the carpet and the substrate.

Using the above stated parameters, automobile kick panels have been manufactured successfully using a polypropylene substrate 42 inches long, 3½ inches wide and 3/16 inch thick, bonded to a latex backed tufted polypropylene fiber carpet 3/16 inch thick. The frequency of the welding apparatus was 240 cylces per second at a displacement amplitude of 0.060 to 0.070 inch peak-to-peak.

While there has been described and illustrated a preferred embodiment of the invention and several modifications thereof, it will be apparent to those skilled in the art that various further changes and modifications may be made without departing from the principle of this invention, which shall be limited only by the scope of the appended claims.

What is claimed is:

1. The method of producing a carpeted panel comprising:
    superposing upon one another a substrate of thermoplastic material and a carpet made of thermoplastic material adapted to bond to said substrate responsive to the generation of frictional heat at the interface between said substrate and said carpet;
    providing forced engagement between said carpet and said substrate which includes using a pattern of closely spaced pins engaging said carpet, and
    subjecting said substrate and carpet while in forced engagement to translating reciprocating motion relative to one another for a predetermined time interval for causing during said interval the generation of frictional heat, whereby upon cessation of said motion and the dissipation of said heat said carpet is bonded to said substrate.

2. The method of producing a carpeted panel as set forth in claim 1, said pins engaging the side of the carpet from which the filaments of the carpet are upstanding.

3. The method of producing a carpeted panel as set forth in claim 1, said pattern of closely spaced pins comprising a quantity ranging between nine to eighty-one pins per square inch.

4. The method of producing a carpeted panel as set forth in claim 1, each of said pins having a height of at least 1.1 times the thickness of the carpet.

5. The method of producing a carpeted panel as set forth in claim 1, each of said pins being tapered near its top with a flat non-piercing end surface.

6. The method of producing a carpeted panel as set forth in claim 1, each of said pins having a rounded end surface.

7. The method of producing a carpeted panel as set forth in claim 1, each of said pins being of square cross-section, tapered near the top and having a flat non-piercing end surface.

8. The method of producing a carpeted panel as set forth in claim 1, the peak-to-peak amplitude of vibrations being less than 0.100 inch.

9. The method of producing a carpeted panel as set forth in claim 1, said carpet including a layer of backing material comprising latex material, and said substrate comprising ABS material, polypropylene material or polyethylene material.

10. The method of producing a carpeted panel as set forth in claim 1, said carpet including a layer of backing material comprising polyethylene material and said substrate comprising polypropylene material or polyethylene material.

11. The method of producing a carpeted panel as set forth in claim 1, said carpet including a layer of backing material comprising polypropylene material and said substrate comprising polypropylene material or polyethylene material.

12. The method of producing a carpeted panel as set forth in claim 1, said carpet comprising nylon or polypropylene material and said substrate comprising ABS material, polypropylene material or polyethylene material.

* * * * *